April 1, 1969 R. A. WARREN ETAL 3,435,938
OMNI-DIRECTIONAL ROLLER
Filed March 29, 1967

INVENTORS
ROBERT A. WARREN
BERNARD SPIRA

Jack C. Munro
-AGENT-

United States Patent Office 3,435,938
Patented Apr. 1, 1969

3,435,938
OMNI-DIRECTIONAL ROLLER
Robert A. Warren, Long Beach, and Bernard Spira, Los Angeles, Calif., assignors, by mesne assignments, to McDonnell Douglas Corporation, Santa Monica, Calif., a corporation of Maryland
Filed Mar. 29, 1967, Ser. No. 626,784
Int. Cl. B65g 13/11, 39/02
U.S. Cl. 193—37                                                        1 Claim

ABSTRACT OF THE DISCLOSURE

A roller conveyor apparatus which is rotatable within a plane which is at right angles to the plane of roller rotation. The roller axis of rotation is offset from the axis of rotation of the apparatus. Such a structure arrangement makes the roller conveyor apparatus self-aligning with the direction of the load transmitted thereon.

Background of invention

In the moving of any physical mass it is well known that friction is lessened by rolling the object to its desired location rather than dragging the object. In the handling of cargo or in the moving of any object from one place to another, quite often conveyor systems are employed. One type of a conveyor system is one which includes a plurality of cylindrical rollers or ball casters which allow easy movement of the physical object by substantially lessening the friction due to movement. It is more feasible and economical for the conveyor system to include the low friction means rather than to include a rolling means on each object to be transported.

To facilitate material handling a pallet is quite often employed. A pallet is usually a substantially planer surface which is employed in a horizontal manner upon which several objects of mass (cargo) are fixedly supported. The pallet is specially adapted for retaining the cargo during transportation thereof, and also is designed to make movement of the loaded pallet to and from the primary transportation means as easy as possible. Usually conveyor systems including rollers and/or ball casters are used to move the pallet into and out of the primary transportation means.

Presently, primary transportation means are vehicles such as trucks, railroads, ships and planes. This invention will be discussed with respect to aircraft although its use in other transportation means is more than likely and its use in other areas of cargo movement is also quite possible. In aircraft, the planes that are specifically designed for cargo, have fixed to the aircraft floor a conveyor system of rollers and/or ball casters. Some planes are convertible, meaning changeable between cargo and passenger, those planes use a removable or invertible conveyor system instead of the fixed type of conveyor system. Of primary concern in the designing of an aircraft conveyor system is that the system be of minimum weight yet of maximum strength and that the system allow a quick loading and unloading of cargo. The conveyor roller of this invention is designed to facilitate ease in the loading and unloading of cargo.

In aircraft the trend has been to employ a side loading technique, that is, the load enters the aircraft in a transverse direction to the fuselage and is then moved longitudinally to the stowed position. This two-directional movement requires a roller bearing which will operate in the two directions or a ball-type of caster. As the ball caster will allow load movement in any direction, prior to this invention it has been used exclusively for a two-directional movement. However, there are certain disadvantages in the use of a ball caster. First, the ball casters establish only point contacts of support for the pallet and load thereon. These point contacts of support make the load per unit area quite high which causes pallet and/or caster failure. Actually, to overcome this high load per unit area more ball casters may be employed in supporting the pallet. Second, the ball caster point contact with the cargo pallet produces high bearing stresses which cause a large amount of pallet damage. In movements, the high stress due to the point contact will cause a pallet to form cracks or grooves which permanently damages the pallet beyond repair. Third, during a teetering condition of the pallet which occurs at a change in the conveyor incline (usually upon entrance or exit of the pallet from the aircraft), the ball caster system is just not capable of providing adequate support. There are constant failures of ball casters in the door area of the aircraft and further, the pallets are subjected to maximum damaging condition.

To overcome the disadvantages of the ball caster it would be more desirable to employ a cylindrical roller type of support. Rollers give a line area of contact with the pallet which would decrease pallet damage and also decrease the load per unit area. In actual use it has been found that a substantially fewer number of roller type of supports need be employed as compared to the ball caster. Also, roller supports are capable of withstanding the periods of greater load as in the teetering position. The use of fewer support units means a savings in both weight and expense and the decrease in the number of failures means additional savings.

Summary

The roller of this invention is cylindrical in design so a line type contact is established. To allow the roller to function in any direction of load travel the roller is permitted to rotate on a base within its support. The roller or rollers are mounted so their specific axis of rotation is displaced from the axis of rotation of the base. It is well known that when the load is moved across a roller, that if the plane of the roller rotation is not exactly in line with the direction of load movement, a torque is created upon the roller which attempts to align it with the direction of movement. By the above construction of the roller apparatus, the roller is permitted to rotate and so align itself with the direction of load movement. No matter from what direction the load is moved across the roller, the roller will so align itself and permit ease of load movement.

Description of an embodiment

Figure 1:
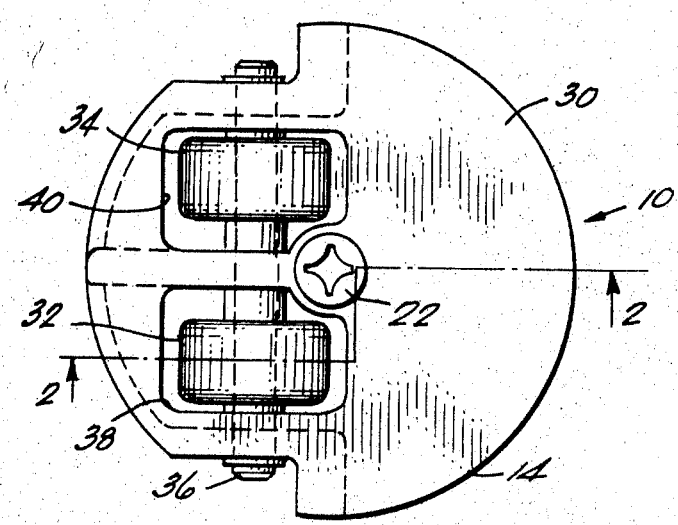
FIGURE 1 is a plan view of a conveyor roller of this invention.
Figure 2:
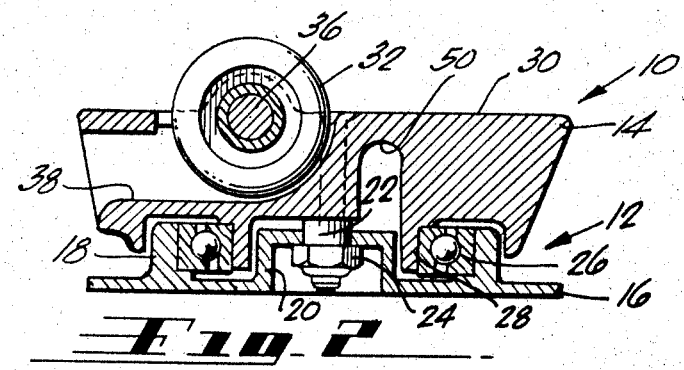
FIG. 2 is a front sectional view of the roller of FIG. 1 taken along line 2—2 in FIG. 1.

In FIGS. 1 and 2 there is shown a conveyor roller assembly 10 formed in two sections, a base 12 and a housing 14. Base 12 has a substantially flat bottom which forms a thin circumferential flange 16. Flange 16 is for the purpose of facilitation attachment of the roller assembly to the associated conveyor structure. Base 12 includes an upstanding outer ring 18 and an upstanding center portion 20. A bolt 22 is passed through the center portion 20 and is to retain the housing 14 to the base 12. The center portion 20 is upstanding so the fastening nut 24 will not protrude below the bottom surface of the base 12. Outer ring 18 is to support a thrust bearing 26 which is connected to the housing 14. A corresponding depending ring 28 is provided on the housing 14 for the purpose of providing a connection to the thrust bearing 26. As appears apparent from the arrangement of the base 12, the housing 14 rotates with respect thereto about bolt 22 as the axis of rotation.

Housing 14 has a flat top portion 30. Two cylindrical rollers 32 and 34 are rotatably mounted within housing 14 in an in-line relationship, shaft 36 being provided for the purpose. The rollers 32 and 34 are mounted so approximately one-half of the roller diameter protrudes above the plane of the top portion 30. Shaft 36 is displaced approximately one-half inch from the bolt 22. However, the amount of displacement is not important only that the roller axis is displaced a sufficient distance to provide the necessary self-alignment function. Each of the rollers 32 and 34 are mounted in a separate opening 38 and 40, respectively. The openings 38 and 40 serve a dual purpose, one being to provide the necessary operating clearance for the roller and to provide a drain for any contamination which might fall within the opening and hinder roller operation. Any number of rollers 32 and 34 could be used, two being shown. However, only one roller might be employed or more than two, depending upon the amount of load distirbution.

Figure 3:
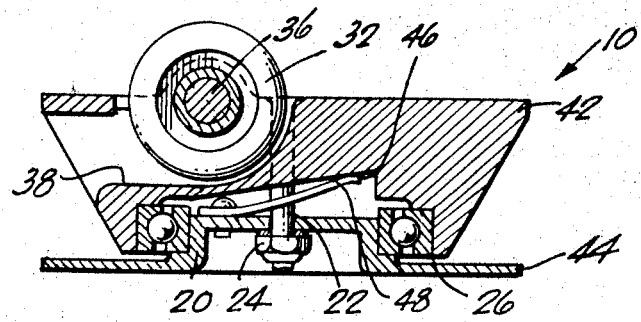
FIG. 3 is a view similar to FIG. 2 but including a modification in structure.

In FIG. 3 then is shown the conveyor roller 10 of FIGS. 1 and 2 wherein a centering device is incorporated which will orient the roller housing in one direction. In most instances the initial movement of the load upon the rollers is from a single direction, as from one door. Although not necessary, it may be desirable to orient all the roller assemblies to be in the first alignment position.

The assembly in FIG. 3 has the same rollers 32 and 34 mounted on a shaft 36 in the same manner, a bolt 22 fastened by a nut 24, a thrust bearing 26 and drain openings 38 and 40 as shown in FIGS. 1 and 2. However, the housing 42 and the base 44 are constructed in a slightly different manner than the housing 14 and the base 12 of the assembly of FIG. 1. The base 44 has no outer ring 18 but the upstanding central portion 20 has been enlarged. The thrust bearing 26 is supported between the central portion 20 and the housing 42. The portion of the housing 42 located directly above the central portion 20 is inclined as at 46. A leaf spring 48 is attached to the top of the central portion 20 and biased against incline 46. It is rather obvious that the roller housing 42 will seek the alignment position where the spring 48 is located in the deepest portion of the incline 46, thereby aligning the conveyor roller assembly in one given direction.

Other types of orienting devices could be employed, as for example the cavity 50 shown in the FIG. 2 embodiment could contain a spring biased plunger (not shown). This plunger would react against an inclined upstanding central portion of the base which would accomplish the same orientation of the roller assembly.

The particular forms of the present invention shown in the drawing and described herein have been found to be most satisfactory. However, the various elements of the combinations and the forms, constructions and arrangements thereof are capable of numerous changes and modifications. In view thereof, it should be understood that the forms of the invention shown in the drawing and herein described are intended to be illustrative only and are not intended to limit the scope of the invention. The scope of the invention is to be limited only by a just interpretation of the following claim.

What is claimed is:

1. A fixed base having an annular upstanding ring element; a housing having a flat upper surface and being rotatably supported upon said base on a first upstanding axis of rotation, centered with respect to said base;
   a plurality of cylindrical rollers in pockets in said flat surface and extending above said flat surface and being rotatably supported within said pockets on a second axis of rotation, said second axis of rotation being displaced from said first axis of rotation and in a plane at right angle with a plane containing the first axis of rotation;
   an opening being provided within the structure of said housing and extending to said pockets to function as a contaminant drain to discharge matter which might hinder the movement of said rollers; and
   a thrust bearing being located between said housing and said upstanding ring element of said base and functioning to permit the rotational movement therebetween, said thrust bearing being capable of permitting free rotation of said housing with said housing being subjected to a substantially large axial load.

References Cited

UNITED STATES PATENTS

| | | | |
|---|---|---|---|
| 393,051 | 11/1888 | Aiken | 193—35 |
| 1,322,808 | 11/1919 | Mikaelson. | |
| 1,861,919 | 6/1932 | Hill. | |
| 2,862,223 | 12/1958 | Meyerhoefer | 16—18 |
| 2,996,752 | 8/1961 | Pope | 16—18 |
| 3,243,062 | 3/1966 | Frassetto | 193—35 |
| 3,015,838 | 1/1962 | Ulinski | 16—48 X |

ANDRES H. NIELSEN, *Primary Examiner.*